United States Patent
Nogue et al.

(10) Patent No.: US 12,269,073 B2
(45) Date of Patent: Apr. 8, 2025

(54) CLEANING PROCEDURE FOR ANILOX BY OVERLAYING LASER SPOTS

(71) Applicant: TEG Technologies Research and Development, S.L., Vilablareix (ES)

(72) Inventors: Lluis Guixeras Nogue, Vilablareix (ES); Rafael Guixeras Llora, Vilablareix (ES)

(73) Assignee: TEG Technologies Research and Development, S.L., Gerona (ES)

(*) Notice: Subject to any disclaimer, the term of this patent is extended or adjusted under 35 U.S.C. 154(b) by 0 days.

(21) Appl. No.: 18/329,732

(22) Filed: Jun. 6, 2023

(65) Prior Publication Data
US 2023/0415208 A1    Dec. 28, 2023

(30) Foreign Application Priority Data
Jun. 22, 2022 (ES) .................................. 202230556

(51) Int. Cl.
| | |
|---|---|
| *B23K 26/073* | (2006.01) |
| *B08B 7/00* | (2006.01) |
| *B23K 26/0622* | (2014.01) |
| *B23K 26/08* | (2014.01) |
| *B23K 26/352* | (2014.01) |

(52) U.S. Cl.
CPC ........ *B08B 7/0042* (2013.01); *B23K 26/0622* (2015.10); *B23K 26/073* (2013.01); *B23K 26/0884* (2013.01); *B23K 26/352* (2015.10)

(58) Field of Classification Search
CPC .............. B08B 7/0042; B23K 26/0622; B23K 26/352; B23K 26/073; B23K 26/0884; B23K 26/36
See application file for complete search history.

(56) References Cited

U.S. PATENT DOCUMENTS

| | | | |
|---|---|---|---|
| 2016/0067824 A1* | 3/2016 | Dajnowski | B23K 26/355 219/121.64 |
| 2018/0251865 A1* | 9/2018 | Dajnowski | C21D 1/34 |
| 2023/0415208 A1* | 12/2023 | Guixeras Nogue | B41F 35/04 |

* cited by examiner

*Primary Examiner* — Sharidan Carrillo
(74) *Attorney, Agent, or Firm* — Defillo & Associates, Inc.; Evelyn A. Defillo

(57) ABSTRACT

Cleaning procedure for anilox including increasing the diameter of the laser spots (4) above the minimum diameter corresponding to focal spot w0 to a working diameter wN, defocusing the pulses of the laser beam (1) using a lens (3) and at the same time, with the help of a galvo mirror (8), redirecting the laser pulses in an organized manner to the cleaning-active zone (19) such that the laser spots (4) that hit the surface of the anilox (9) partially overlap in the linear direction (11) corresponding to the beam advancement and in the circumferential direction (13) corresponding to the direction of the anilox turn, simulating a continuous pulse.

6 Claims, 4 Drawing Sheets

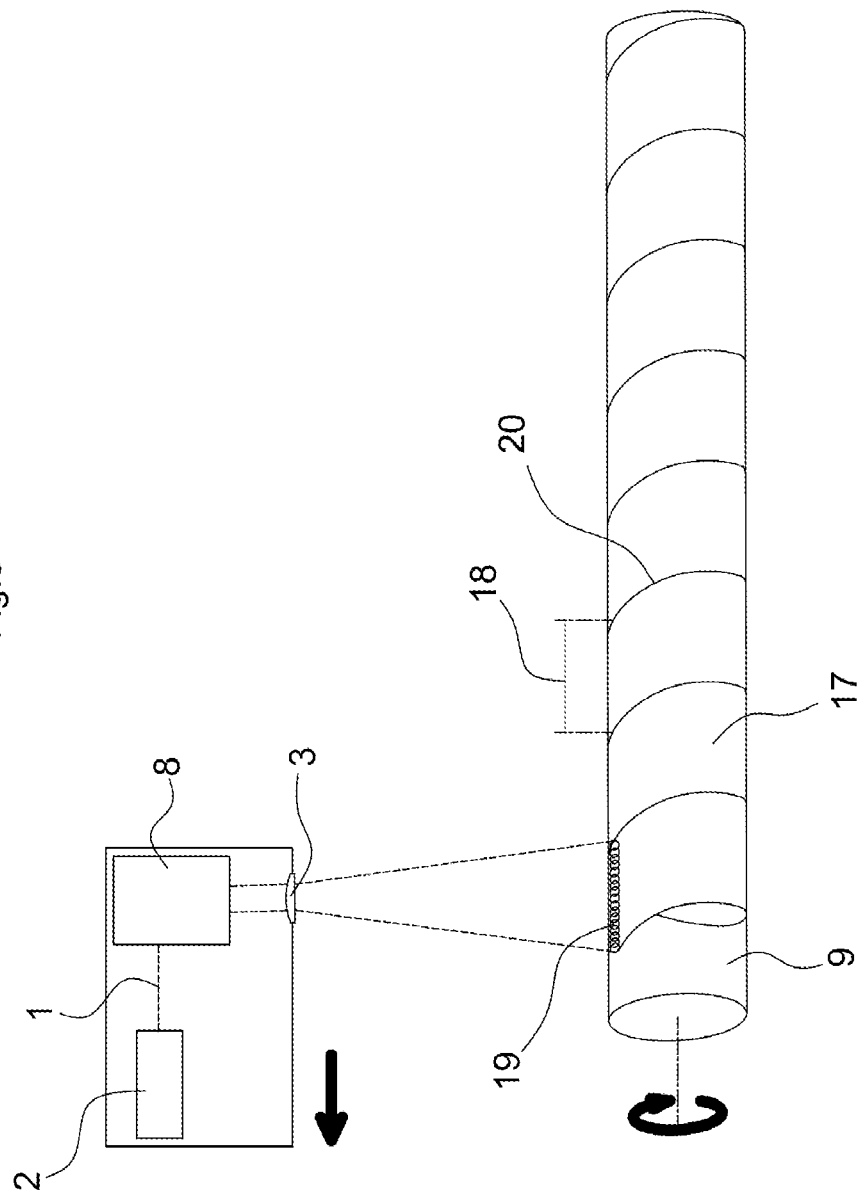

CLEANING PROCEDURE FOR ANILOX BY OVERLAYING LASER SPOTS

FIELD OF THE INVENTION

The present invention relates to a method for removing ink debris in cells from an anilox roll by laser scanning based on the overlap of the laser spots.

BACKGROUND TO THE INVENTION

Laser sweep is a technique that is based on the ablation principle, a process in which a laser beam starts or vaporizes material from the surface of a solid object by hitting it.

The matter leaves the surface in the form of a gas jet, often incandescent, called an ablation pen because of its oval shape.

Laser cleaning systems remove ink from the cells of an anilox roller by a pulsed light wave at a given repetition rate, as a pulsed laser beam has been empirically shown to be more efficient and provide a higher removal rate than a continuous beam while ensuring that the underlying material does not overheat.

In a laser sweep system, keep in mind that:

A along the laser beam, the power is always the same as there is the same number of photons at any spot or section of the beam.

The laser beam has a shape that begins converging as it exits the resonator lens to the focal spot, which is the narrowest area of the beam and diverges past this focal spot.

Since there is the same number of photons at any spot or section of the beam and its radius varies along the beam, so does the ratio of power to irradiated area, or the same thing, power density.

This concept is important since, as the laser spot diameter is reduced, the power density increases in quadratic form.

Thus, by defocusing the Rayleigh range, which is the distance from the focal spot to the spot where the area doubles, four times more energy is needed to maintain the same energy density.

Consequently, for a resonator of a certain power, the density of energy with which the anilox surface is irradiated will be based on the diameter of the laser spot that affects its surface, being maximum when the incision spot coincides with the focal spot.

The operation of the laser sweep system is as follows:

A resonator emits pulses of light at a specific power and frequency to a Galvo mirror system that also oscillates at a frequency.

The galvo system diverts light pulses into the anilox's cells by distributing them linearly in which it constitutes the active cleaning zone of the sweep.

This cleaning-active zone is perceived by the human eye as a luminous line encompassing an alignment of anilox cells by the effect of persistence of vision, although really it consists of an immense number of pulses incident on the anilox cells in a spaced form.

In the actual technique, the laser pulse incidence spot with the anilox surface matches the beam focal spot.

Thus, the applied energy density is maximum, which means maximizing the ablation capacity of the sweep. However, with this technique, the pulse irradiation area is minimal and the dispersion of impacts in the cleaning-active zone of the sweep is large, observing spot where the laser beam affects by vaporizing the ink and spaces between those spots where the ink remains. Therefore, multiple laser sweeps over the same area are required to ensure ink vaporization in all anilox cells.

The sweep performed describes a helical path surrounding the surface of the anilox, resulting from the sum of the rotational movement of the anilox and advancement of the resonator so that, in order to perform several passes over the same zone, the pitch of the sweep helix is to be less than the length of the active cleaning zone of the sweep.

The difference between the helix pitch and the length of the cleaning active zone is adjusted as a function of the percentage of free spaces between impact points of the laser pulses so that, statistically, the result of the laser sweep ensures that the entirety of anilox cells have been cleaned.

The problem of this technique is that, by effecting several passes of the laser beam on the same area of the anilox, a part of the laser pulses incident on clean cells where previously already incised another pulse, which leads to a deterioration of deterioration of these cells.

It would be beneficial to develop a laser-sweep anilox cleaning procedure that avoids the incidence of laser pulses on cells where the ink has already been vaporized to prevent deterioration of the anilox surface.

EXPLANATION OF THE INVENTION

The novel anilox cleaning process consists in simulating a laser continuous pulse by preventing unirradiated spaces by increasing the diameter of the laser spot and organizing these in the active cleaning zone of the sweep such that they overlap linearly in the direction of advancement of the beam and circumferentially in the direction of rotation of the anilox.

The procedure is based on two intrinsic characteristics of the pulsed laser beam.

On the one hand, the variation of the energy density according to the diameter of the laser spot explained above and, on the other hand, the Gaussian structure of the laser beam.

Laser light is a monochromatic electromagnetic radiation whose magnetic field amplitude profile and transverse electric field profile are given by a Gaussian function, implying a Gaussian intensity profile (irradiance).

A lens can modify the geometry of the laser beam without altering its power and frequency, so when the laser beam is focused by a lens, the dependence of the transverse phase is altered and this causes a different Gaussian beam but with the same power and frequency.

This provides a useful mechanism for changing the irradiance at the spot of the beam incident on the anilox at will.

Beam diameter can be defined in several ways and for Gaussian beams it is usually described by "width $1/e^2$". "Width $1/e^2$" is the distance between the two spot of the marginal distribution whose intensities are $1/e^2=0.135$ times the value of the maximum intensity.

From the above application, it is detached that, in a typical Gaussian distribution, the marginal distribution points have only 13% of the center energy intensity, however, by defocusing the beam with a lens, the Gaussian profile is achieved so that the difference in energy intensity between the marginal distribution and the center of the laser spot decreases.

Considering all the foregoing, the procedure of the invention consisting essentially of increasing the size and partially overlaying the spot of the laser beam has been developed to simulate a continuous pulse in both the forward direction of the laser beam and the direction of the anilox turn.

By partially overlapping the laser spots in the cleaning-active zone eliminates non-irradiated gaps and pulses affect all anilox cells continuously and with the appropriate energy density to evaporate the ink without the need for additional passes, eliminating the risk of a pulse impacting an area of the previously irradiated anilox.

Specifically, according to the new procedure, the laser beam generated by the resonator is defocused by a lens, increasing the spot diameter of the pulses that affect the cells to a desired extent.

While increasing the spot diameter, the associated Gaussian profile is also modified, decreasing the energy intensity in the center, and increasing it in the marginal distribution spot, so that a Gaussian profile is obtained more homogeneous than that associated with the focal spot.

Having determined the appropriate laser spot diameter and Gaussian profile, the procedure proceeds with linear overlap of the laser spots.

To do this, the pulses of the laser beam are deflected by the galvo mirror oscillating in a frequency calculated based on the beam frequency and spot diameter, so that the laser spots that impact the surface of the anilox partially overlay.

Overlap of the laser spots that make up the active sweeping area is done at two levels; at linear level in the direction of advancement of the resonator and circumferential in the direction of the anilox turn.

According to the invention, the overlapping percentage of the laser spots in the linear direction is set as a function of the oscillation frequency of the galvo system in the X-axis ($f_{galboX}$), the spot diameter ($\emptyset_{spot}$), beam length ($l_{beam}$) and beam frequency ($f_{laser}$) according to the expression $$\text{Linear overlay} = 1 - \left( \frac{2 \cdot f_{galboX} \cdot l_{beam}}{\emptyset_{spot} \cdot f_{laser}} \right) \%$$

Similarly, the percentage of circumferential overlay is given by the linear speed of the anilox ($\omega_{rot} r_{anilox}$) and the oscillation frequency of the galvo system on the Y axis ($f_{galboY}$) which determines the beams generation speed of the galvo system and is defined by the following expression $$\text{Circunferencial overlay} = 1 - \left( \frac{\omega_{rot} r_{anilox}}{2 f_{galboY} \cdot \emptyset_{point}} \right) \%$$

The percentage of linear and circumferential overlay of the spot according to the invention ranges from 30% to 75% based on the associated Gaussian profile.

Partial overlaying of spot increases the energy intensity in the overlap area, as the energy intensity for each spot is added up.

Since, due to the Gaussian profile of the beam, the spot of the marginal distribution has a lower energy intensity than the centre, the partial overlapping of spots has the associated effect of homogenising the radiation received by the anilox surface. The flatter the Gaussian profile of the laser beam, the more uniform the radiation received by the anilox surface.

In accordance with the foregoing, the laser beam according to the procedure of the invention performs a helical sweep of the anilox surface in which 100% of the swept surface is irradiated with the appropriate energy density to evaporate the ink in a single pass, for this reason the propeller passage described by the helical sweep is equivalent to or multiple of the length of the cleaning-active zone, allowing for more surface area per rotation than the prior art, increasing cleaning speed.

According to another aspect of the invention the passage of the sweep helix is slightly less than the length of the cleaning-active zone to also overlap the ends of the swept area to an extent equal to the percentage of overlap of the laser spot, ensuring maximum radiation uniformity of the anilox surface.

The procedure described, applied to a conventional laser-sweep anilox cleaning device, increases its efficiency by cleaning in a fraction of the time required with the current multi-scan technique, without degrading the anilox cells at all to never impact the laser beam on a previously irradiated spot.

At the same time, varying the "spot diameter" and "% overlay" parameters allow to develop different cleaning programs selectable depending on the type or soil level of the anilox.

BRIEF DESCRIPTION OF THE DRAWINGS

To complement the description being made and to aid in a better understanding of the features of the invention, a set of drawings is attached as an integral part of said description wherein, by way of example and not limitation, the following has been represented:

FIG. 8.—Schematic representation of the helical path describing the laser sweep cleaning-active zone on anilox surface.

PREFERENTIAL EMBODIMENT OF THE INVENTION

Figure 1:
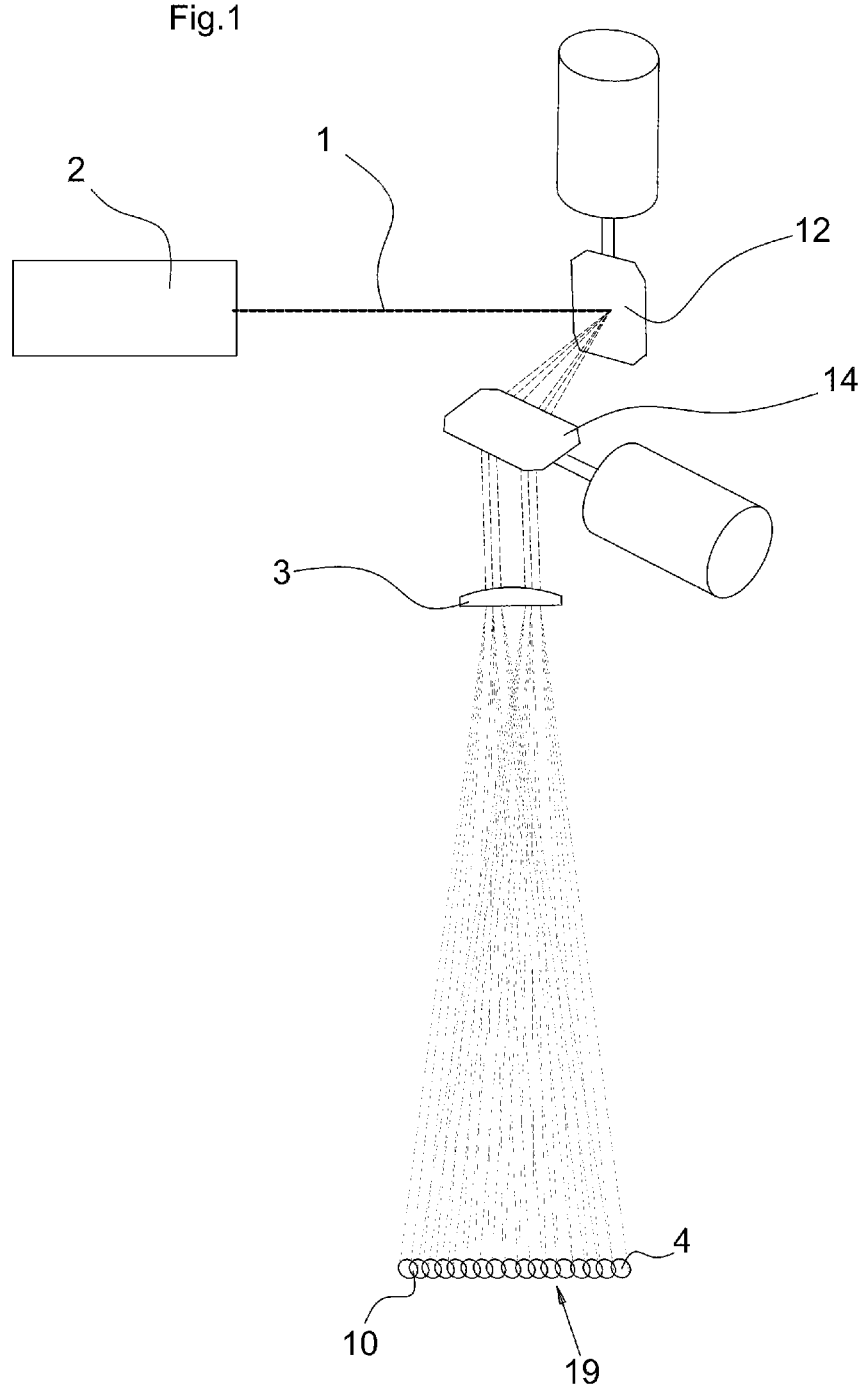
FIG. 1.—Schematic of the procedure for cleaning anilox by overlaying laser spot according to the invention.
Figure 2:
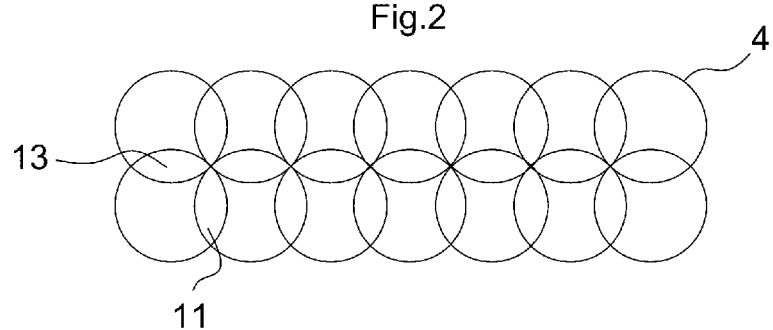
FIG. 2.—Representation of a set of laser spots with 30% overlay.
Figure 3:
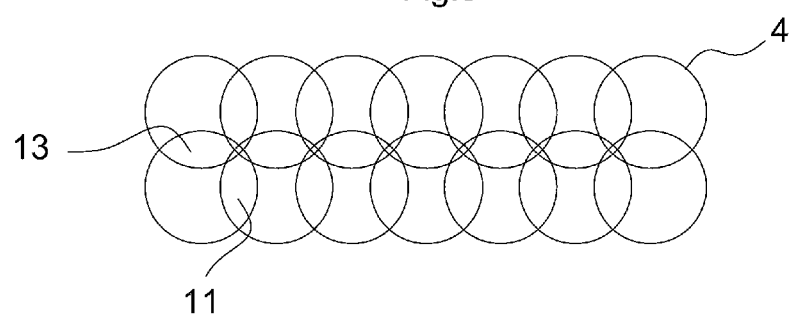
FIG. 3.—Representation of a set of laser spots with 33% overlay.
Figure 4:
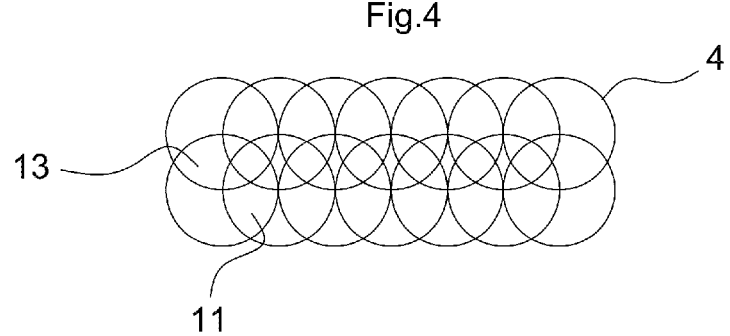
FIG. 4.—Representation of a set of laser spots with 50% overlay.
Figure 5:
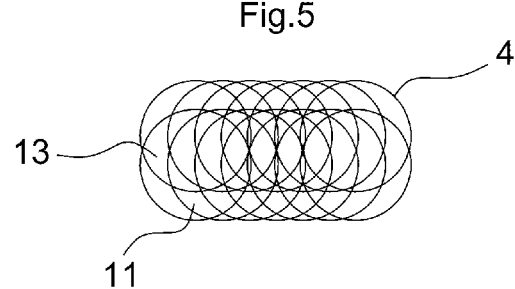
FIG. 5.—Representation of a set of laser spots with 75% overlay.
Figure 6:
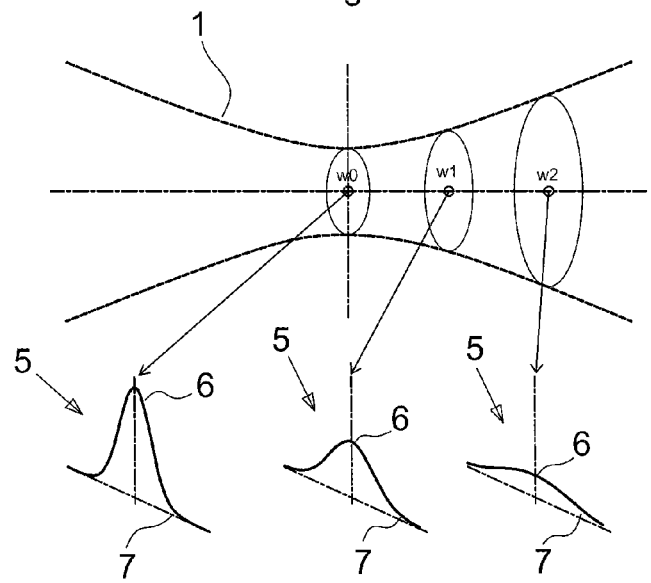
FIG. 6.—Diagram of the Gaussian profile change according to the diameter of the spot.

The novel anilox cleaning procedure consists of organizing the succession of laser spot (4) in the cleaning-active zone (19) of the sweep (17) according to an alignment in which the spots partially overlay in the forward direction of the beam (11) and in the direction of the anilox turn (13) by simulating a continuous pulse.

According to the new procedure, the laser beam (1) generated by the resonator (2) is defocused by a lens (3) that increases the diameter of laser spot (4) that affects the cells from a minimum diameter corresponding to focal spot w0 to a working diameter wN.

The increase in the diameter of the laser spot (w0<w1<w2) also modifies the associated Gaussian profile (5), decreasing the energy intensity in the center (6) and increasing it in the marginal distribution (7), so that at spot w1 and w2 a more homogeneous Gaussian profile is obtained than at focal spot w0.

Once the working diameter of the wN laser spot has been established, the partial overlap (10) of the laser spots (4) is continued.

In order for the laser spots incident on the surface of the anilox (9) to partially overlay (10), the pulses of the laser beam (1) are deflected by the galvo mirror (8) which oscillates at a frequency selected according to the frequency of the laser beam pulses (1) and the working diameter wN of the laser spot (4).

Overlap of laser spots is performed linearly (11) in the forward direction of the resonator (2) and circumferentially (13) in the direction of the anilox (9) turn.

According to the invention, the percentage overlap of the laser spots in linear direction (11) is set based on ($f_{galboX}$) the oscillation frequency of the galvo system on the X-axis (12), ($\emptyset_{spot}$) the diameter of the laser spot (4), ($l_{beam}$) beam length y ($f_{laser}$) the frequency of the pulses of the laser beam (1) according to the expression $$\text{Linear overlay} = 1 - \left(\frac{2 \cdot f_{galboX} \cdot l_{beam}}{\emptyset_{spot} \cdot f_{laser}}\right)\%$$

Therefore, it is sufficient to adjust the parameters appropriately to achieve the desired level of overlap.

Similarly, the circumferential overlap percentage (13) is given by ($\omega_{rot} r_{anilox}$) the linear speed of the anilox (9), ($\emptyset_{spot}$) the diameter of the laser spot (4) and ($f_{galboY}$) the oscillation frequency of the galvo system on the Y-axis (14), according to the following expression $$\text{Circunferencial overlay} = 1 - \left(\frac{\omega_{rot} r_{anilox}}{2 f_{galboY} \cdot \emptyset_{point}}\right)\%$$

Figure 7:
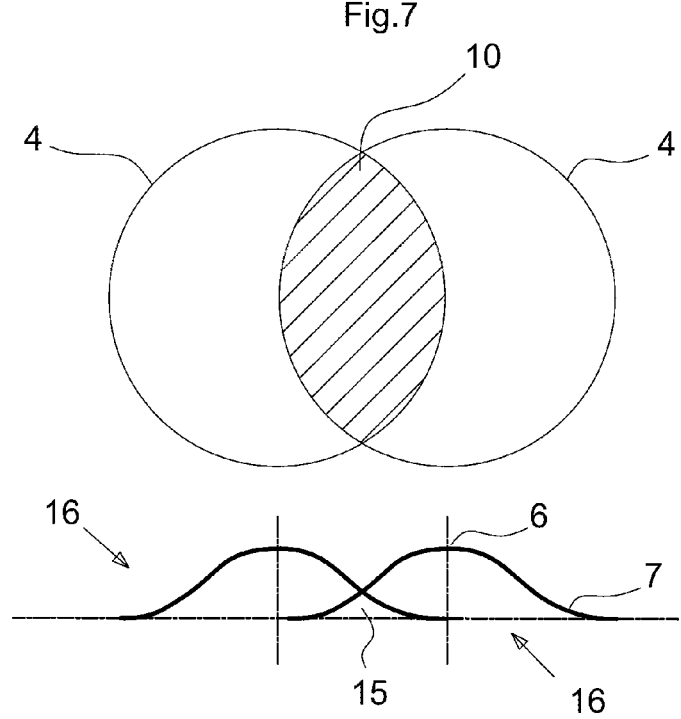
FIG. 7.—Energic distribution diagram for two laser spots overlaying by 50%.

The partial overlaying of spot increases the energy intensity in the overlap-area (15) FIG. 7, as the energy intensity for each spot is added up (16).

In accordance with the foregoing, by combining the forward motion of the resonator (2) and the rotational movement of the anilox turn (9), the cleaning-active zone (19) performs a helical sweep (17) over the anilox (9) in which 100% of the swept surface is irradiated with the appropriate energy density to evaporate the ink in a single pass.

For this reason, the step (18) of the helical sweep (17) is equivalent to or multiple of the length of the cleaning-active zone (19).

According to another aspect of the invention, the step (18) of the helical sweep (17) is slightly less than the length of the cleaning-active zone (19) in order to overlap the laser spots at the ends of the sweep area (20). This overlapping is preferably in a proportion equal to that of the linear overlaying (11) of the laser spot (4), which ensures maximum uniformity of irradiation of the anilox surface over the entire sweep area.

The invention claimed is:

1. A cleaning procedure for an anilox roller, the cleaning procedure comprising the steps of:
    generating a laser beam by using a resonator;
    defocusing the laser beam by using a lens, wherein the defocusing step increases a diameter of laser spots on a surface of the anilox roller;
    redirecting the increased diameter laser beam by using a galvo mirror,
    wherein the laser beam is redirected to a cleaning-active zone on the surface of the anilox roller such that the laser spots hitting the surface of the anilox roller partially overlap in a linear direction corresponding to an advancement of the laser beam and in a circumferential direction corresponding to a turning direction of the anilox roller simulating a continuous pulse of the laser beam.

2. A cleaning procedure for an anilox roller, the cleaning procedure comprising the steps of:
    generating a laser beam by using a resonator;
    defocusing the laser beam by using a lens, wherein the defocusing step increases a diameter of laser spots on a surface of the anilox roller;
    redirecting the increased diameter laser beam by using a galvo mirror,
    wherein the laser beam is redirected to a cleaning-active zone on the surface of the anilox roller such that the laser spots hitting in the surface of the anilox roller partially overlap in a linear direction corresponding to an advancement of the laser beam and in a circumferential direction corresponding to a turning direction of the anilox roller simulating a continuous pulse of the laser beam;
    calculating a percentage of the overlap of the laser spots in the linear direction based on ($f_{galboX}$), an oscillation frequency of the galvo mirror on an X-axis, ($\emptyset_{spot}$), a diameter of the laser spot, ($l_{beam}$), a beam length and ($f_{laser}$), a beam frequency according to the formula:

$$\text{Linear overlay} = 1 - \left(\frac{2 \cdot f_{galboX} \cdot l_{beam}}{\emptyset_{spot} \cdot f_{laser}}\right)\%.$$

3. A cleaning procedure for an anilox roller, the cleaning procedure comprising the steps of:
    generating a laser beam by using a resonator;
    defocusing the laser beam by using a lens, wherein the defocusing step increases a diameter of laser spots on a surface of the anilox roller;
    redirecting the increased diameter laser beam by using a galvo mirror,
    wherein the laser beam is redirected to a cleaning-active zone on the surface of the anilox roller such that the laser spots hitting the surface of the anilox roller partially overlap in a linear direction corresponding to an advancement of the laser beam and in a circumferential direction corresponding to a turning direction of the anilox roller simulating a continuous pulse of the laser beam;
    calculating a percentage of the overlap of the laser spots in the circumferential direction based on ($\omega_{rot} r_{anilox}$), a linear speed of the anilox roller, ($\emptyset_{spot}$), a diameter of the laser spot and ($f_{galboY}$), an oscillation frequency of the galvo mirror on a Y-axis, according to the formula:

$$\text{Circunferencial overlay} = 1 - \left(\frac{\omega_{rot} r_{anilox}}{2 f_{galboY} \cdot \emptyset_{point}}\right)\%.$$

4. The cleaning procedure for the anilox roller according to claim 1, wherein the laser beam creates a helical path during a sweep on the surface of the anilox roller.

5. The cleaning procedure for the anilox roller according to claim 1, wherein the laser beam creates a helical path during a sweep on the surface of the anilox roller, wherein the helical path is less than a length of the cleaning-active zone.

6. The cleaning procedure for the anilox roller according to claim 1, wherein the overlap in the linear direction and the circumferential direction is between 30% and 75%.

* * * * *